(12) United States Patent
Bierschenk et al.

(10) Patent No.: US 6,945,386 B2
(45) Date of Patent: Sep. 20, 2005

(54) BUCKET ELEVATOR CONVEYORS

(75) Inventors: Dean Bierschenk, Denver, IA (US); Mark Parsons, Cedar Falls, IA (US); Paul Grovert, Algona, IA (US)

(73) Assignee: Universal Industries, Inc., Cedar Falls, IA (US)

( * ) Notice: Subject to any disclaimer, the term of this patent is extended or adjusted under 35 U.S.C. 154(b) by 108 days.

(21) Appl. No.: 10/249,744

(22) Filed: May 5, 2003

(65) Prior Publication Data

US 2004/0094390 A1 May 20, 2004

Related U.S. Application Data

(60) Provisional application No. 60/380,038, filed on May 6, 2002.

(51) Int. Cl.[7] .............................................. B65G 47/40
(52) U.S. Cl. ...................... 198/713; 198/703; 198/705; 198/712
(58) Field of Search ................................ 198/713, 712, 198/706, 705, 703, 701

(56) References Cited

U.S. PATENT DOCUMENTS

| | | | | |
|---|---|---|---|---|
| 3,640,384 A | * | 2/1972 | Del Rosso ................. 209/561 |
| 3,756,373 A | * | 9/1973 | Pettis et al. ............... 198/464.1 |
| 4,607,745 A | * | 8/1986 | Wiese ......................... 198/706 |
| 4,770,287 A | * | 9/1988 | Glowatzki ................... 198/706 |
| 4,890,722 A | * | 1/1990 | Gough ........................ 198/706 |
| 4,892,179 A | * | 1/1990 | Lassiter et al. ......... 198/370.05 |
| 4,960,199 A | * | 10/1990 | Lassiter et al. ............. 198/494 |
| 4,972,934 A | * | 11/1990 | Lassiter et al. ........ 198/370.05 |
| 5,038,910 A | * | 8/1991 | Lassiter et al. .......... 198/349.6 |
| 5,526,921 A | * | 6/1996 | Kovalak et al. ............ 198/706 |
| 5,641,057 A | | 6/1997 | Chorlton |
| 6,334,527 B1 | * | 1/2002 | Kitamura .................... 198/704 |

* cited by examiner

Primary Examiner—Douglas Hess
(74) Attorney, Agent, or Firm—James C. Nemmers

(57) ABSTRACT

A bucket elevator conveyor system of the straight horizontal, "C" and "Z" configurations. In these bucket elevator conveyor systems, loading of the buckets can occur anywhere along the horizontal run adjacent the take-up end and discharge of the buckets can be made at the drive area or along the bottom run of the upper horizontal sections of the "Z" and "C" configuration. This provides not only for discharge of the product from the buckets traveling along the lower path of the conveyor, but also provides for simple, intermediate discharge. In addition, there are provided relapping mechanisms to assure proper relapping of the buckets, This is accomplished by reason of a unique bucket design having a cam on one end combined with the front and rear flanges angled to assure proper operation and lapping of the buckets.

9 Claims, 7 Drawing Sheets

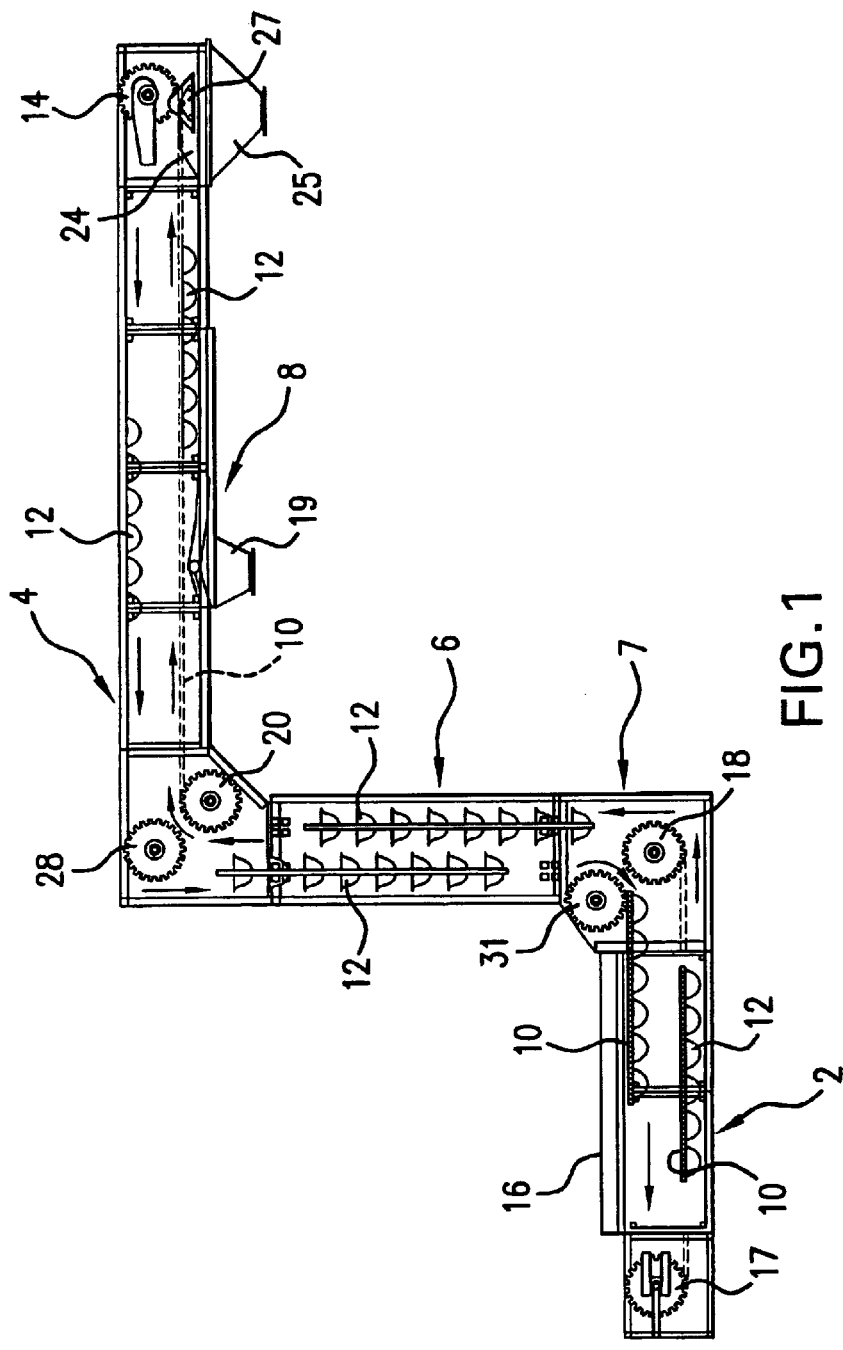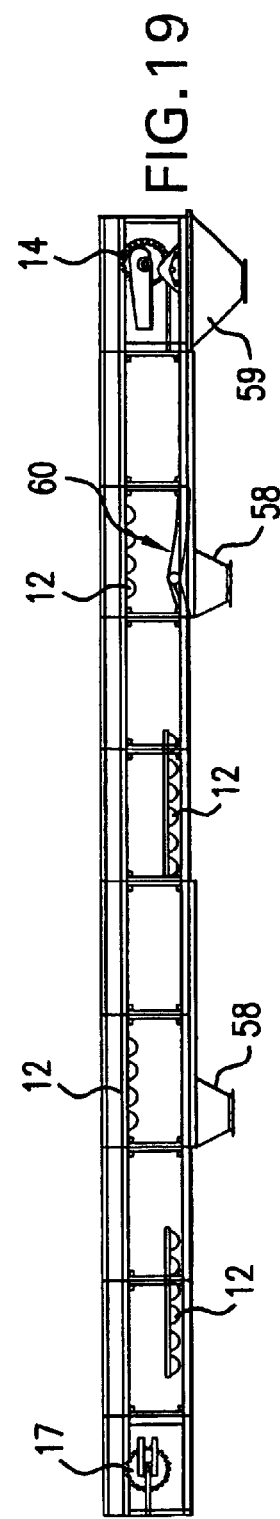

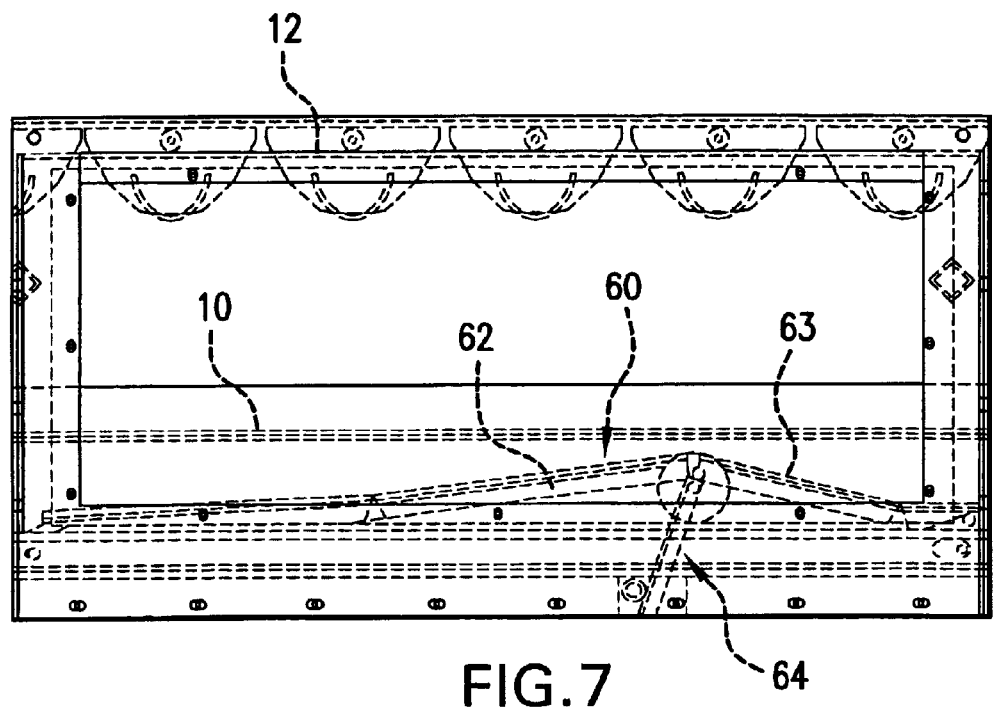
FIG.7
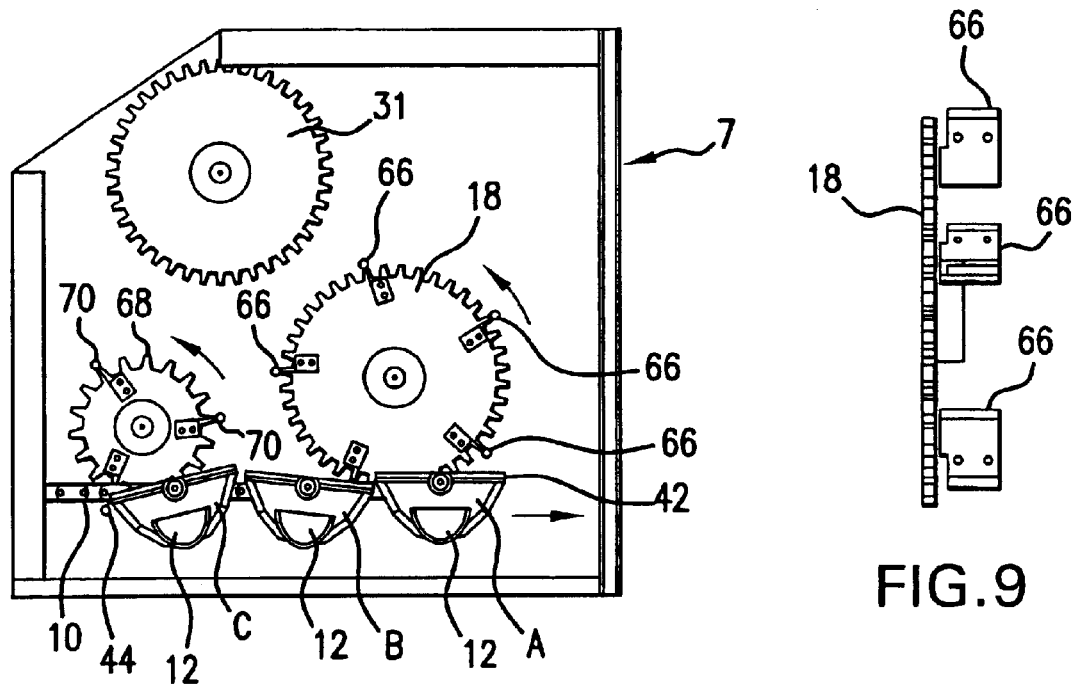
FIG.8
FIG.9

BUCKET ELEVATOR CONVEYORS

BACKGROUND OF INVENTION

The invention relates to improvements in bucket elevator conveyor systems used for the general transport of loose materials in such a way that the carrying buckets operate with minimum spillage and without damage to the product or the apparatus itself.

Bucket elevator conveyor systems to which the invention relates are of a type in which buckets are rotatably supported between two parallel, spaced apart endless chains that carry the buckets along a defined path including the negotiation of corners. The buckets are arranged in spaced apart relationship but with overlapping edges so that at a filling station, the product to be conveyed can be discharged into the buckets with a minimum of spillage. The buckets are arranged so that they are tipped at a discharge station to empty their contents. Bucket elevator conveyor systems are known and available in various configurations including straight horizontal, "C"-shaped, as well as "Z"-shaped. The particular configuration depends upon the specific needs of the user.

Bucket elevator conveyors of this type are used for handling a wide range of products, especially those that are required to be handled gently during production and/or packaging to avoid damage to the product. Such products include a variety of products in the industrial, candy, agricultural industry, such as seeds, as well as a variety of products in the food industry.

Known bucket elevator conveyors in most instances operate reliably and efficiently. However, the buckets in known systems are typically filled as the buckets pass along a path at the top of the supporting structure, and they discharge the product as the buckets rotate around the sprockets driving the chains carrying the buckets. With known systems, if it is desired to discharge product at a point intermediate of the drive or take up sprockets, mechanisms are provided to tip the buckets as they pass along a horizontal path between the sprockets. With known systems, however, discharge must occur while the buckets are upright and traveling along the top path of the elevator-conveyor structure. Therefore, if intermediate discharge is desired, sloped chutes must be built into the inside of the conveyor structure and the product directed so as to avoid the return path of the buckets. This typically requires that the conveyor supporting framework being deeper to accommodate the additional structure for the chutes.

In addition, the buckets in elevator conveyors of this type typically have front and rear edges that overlap so that spillage of the product is minimized at the filling station. When these buckets are tipped to discharge the product, or when they are elevated and must change from a horizontal path to a vertical path, the buckets must be relapped or they can jam and cause a shut down of the entire system, usually with the loss of product and the loss of production time. In addition, with most known systems, if a single bucket is not properly lapped or if it is intentionally or inadvertently tipped so that it is not properly lapped, jamming may occur with loss of considerable product and production time.

There is therefore a need for bucket elevator conveyor systems that can discharge product at stations intermediate of the drive and take-up mechanisms and discharge the product at intermediate stations from the lower path of the conveyor system, thus eliminating the necessity of relatively expensive and complex chutes and the accompanying framework that is necessary in systems where intermediate discharge occurs from the buckets traveling along the upper path of the conveyor.

There is also a need for improvements in relapping mechanisms and techniques that will assure proper relapping of the buckets to minimize jamming of the system.

SUMMARY OF INVENTION

The invention relates to bucket elevator conveyor systems of all different types, including, straight horizontal, "C" and "Z" configurations. In the bucket elevator conveyor systems of the invention having the "Z" or the horizontal configuration, the direction of the buckets is reversed from that of known systems of these types in which the product loading station is near the take-up end of the conveyor and the discharge station is at the drive end of the conveyor. In the systems of the invention, loading of the buckets can occur anywhere along the horizontal run adjacent the take-up end and discharge can be made at the drive area or along the bottom run of the upper horizontal sections of the "Z" and "C" configuration and anywhere along the bottom run of the horizontal type unit. This is of significance since it provides not only for discharge of the product from the buckets traveling along the lower path of the conveyor, but also provides for much simpler intermediate discharge. The invention also provides an extremely simple mechanism for intermediate discharge. In addition, the invention provides for improved relapping mechanisms. In one embodiment, relapping is accomplished by a simple incline-decline ramp that engages uniquely-shaped cams on the end of each bucket. In another embodiment of the invention, relapping is accomplished by the provision of paddles on two adjoining sprockets that in synchronized sequence will properly tip adjacent buckets to assure proper relapping. In yet a third embodiment of the invention, relapping occurs by the provision of unique cam ramps that not only engage the cams on the ends of each bucket, but also engage the bucket itself to positively turn the bucket and accelerate it into proper position for correct relapping. All of the foregoing are accomplished by reason of a unique bucket design having a unique cam on one end combined with the front and rear edges angled to assure proper operation and lapping of the buckets.

BRIEF DESCRIPTION OF DRAWINGS

FIG. 1 is a side elevational view of a "Z" configuration bucket elevator conveyor of the invention that contains provision for intermediate discharge;

FIG. 7 is an enlarged side elevational view of a portion of the conveyor of FIG. 1 illustrating the mechanism for intermediate discharge;

FIG. 8 is an enlarged side elevational view of a portion of the conveyor of FIG. 1 to illustrate one embodiment of a relapping mechanism;

FIG. 9 is an end elevational view of one of the paddle sprockets of FIG. 8;

FIG. 19 is a side elevational view of an extended horizontal conveyor section showing multiple discharge stations.

DETAILED DESCRIPTION

The various features of the invention relate to bucket elevator conveyors which can be produced in a variety of configurations depending upon the requirements of the user. These conveyors are designed to handle a variety of different products for the food, industrial and agricultural industries. Although the conveyor are designed to move products that need to be handled gently to avoid damage to the product, the conveyors can be used to handle a wide variety of other products as well.

Figure 2:
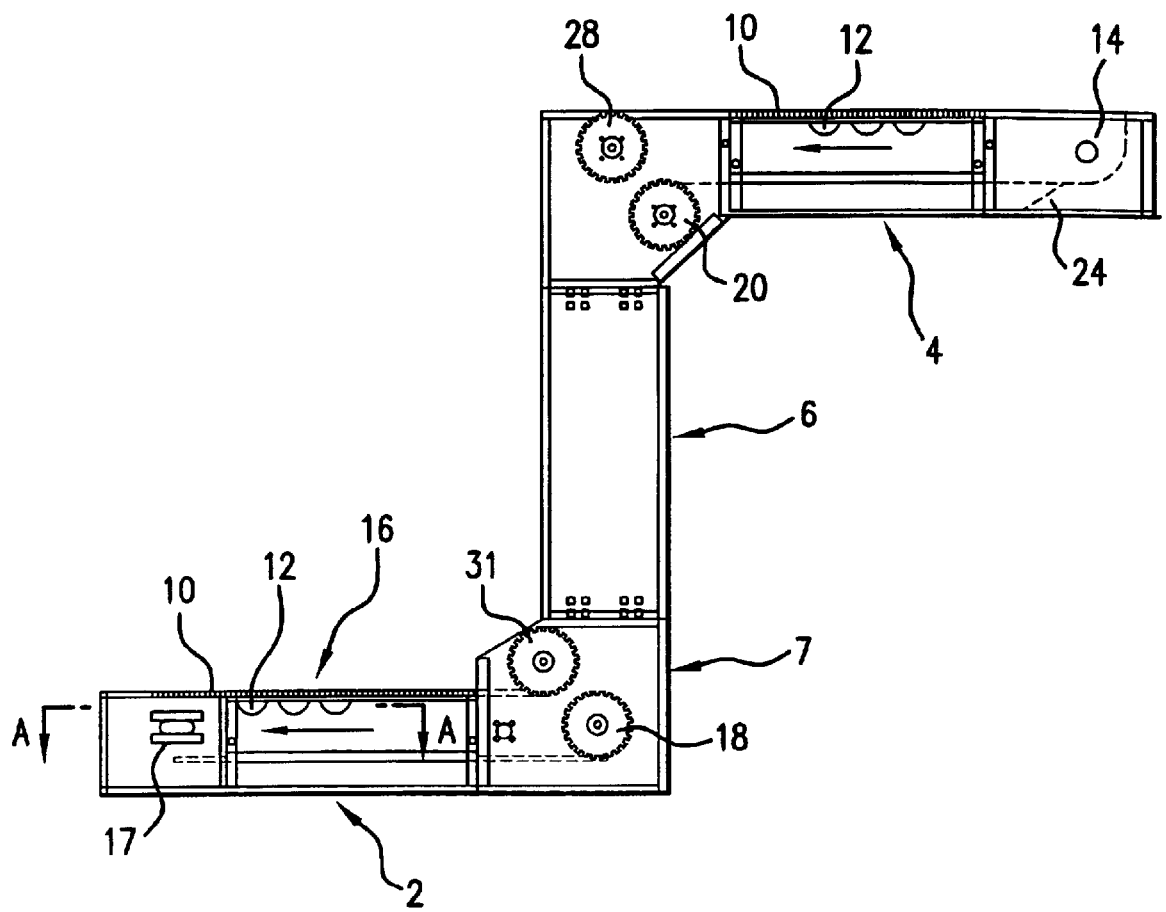
FIG. 2 is a side elevational view of a "Z" configuration conveyor similar to FIG. 1 but not having an intermediate discharge, parts of the view being broken away to illustrate the operation of the conveyor.
Figure 3:
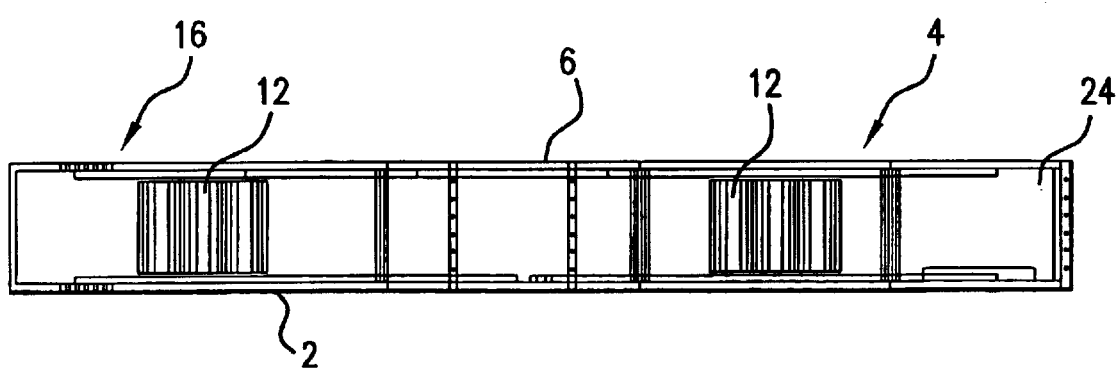
FIG. 3 is a top or plan view of the conveyor of FIG. 2.
Figure 4:
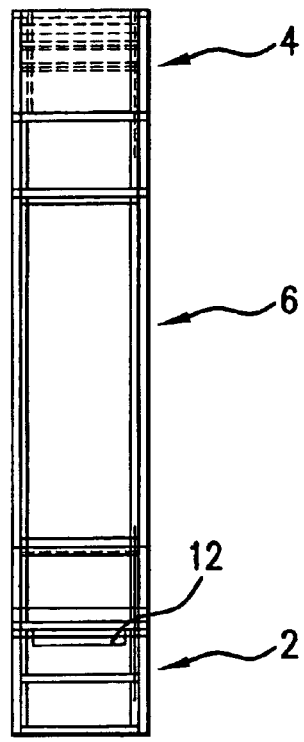
FIG. 4 is an end elevational view of the conveyor of FIG. 2 viewing the conveyor from the right side of FIG. 2.

Referring first to FIGS. 1 through 7, there is illustrated a conveyor with a "Z" configuration. FIGS. 1 and 2 are similar in that each has a lower horizontal section 2, an upper horizontal section 4 with a vertical section 6 joining the two horizontal sections to form the "Z" configuration. FIG. 1 shows the upper horizontal section 4 as containing an intermediate discharge station 8 while the conveyor of FIG. 2 is substantially identical except that the upper horizontal section does not contain the intermediate discharge station 8. The intermediate discharge station 8 will be described in more detail hereinafter.

Each of the sections 2, 4 and 6 are defined by suitable structural framework as shown in the drawings, which framework houses endless, parallel spaced apart chains 10 that are guided by tracks (not shown) as is well know to those skilled in the art. In between chains 10 are suspended buckets 12 which carry the product being conveyed. The buckets 12 are suspended around the entire length of the chains 10, overlapping each other along the horizontal runs in the manner described herein. The figures of the drawings do not show all of the buckets, but merely some buckets 12 in each of the conveyor sections, although it will be understood by those skilled in the art that the buckets 12 are suspended from the chains 10 in end-to-end, spaced apart relationship along the entire length of the chains 10. The chains 10 are driven by drive sprockets 14 located at the outer end of the upper section 4. The chains 10 are driven by the drive sprocket 14 by any suitable power means, such as an electric motor (not shown), in the direction of the arrows shown on FIG. 1. The buckets 12 are filled at the loading station 16 near the take-up sprocket 17 and move around the sprocket 17 and then along the lower rung of the lower section 2 and around a guide sprocket 18 which directs the chains 10 and buckets 12 upwardly through the vertical section 6. When the chains 10 carrying buckets 12 reach the top of the vertical section 6, guide sprockets 20 guide the buckets 12 to a horizontal path along the lower portion of the upper section 4. As the buckets 12 move along the lower path of the upper section 4, their contents may be discharged at the intermediate discharge station 8 into hopper 19 or they selectively may continue on and the contents of the buckets 12 discharged into hopper 25 at the discharge station 24 at the outer end of the upper section 4. The empty buckets 12 are then turned approximately 270 Â° as they travel around the drive sprockets 14, the buckets being turned by tracks including the upside down "U" track 27. The buckets 12 then travel along the upper section 4 toward the vertical section 6 where the buckets are guided downwardly through the vertical section by guide sprockets 28. At the lower end of the vertical section 6, guide sprockets 31 will return the buckets along a horizontal path to and beneath the loading station 16.

Figure 5:
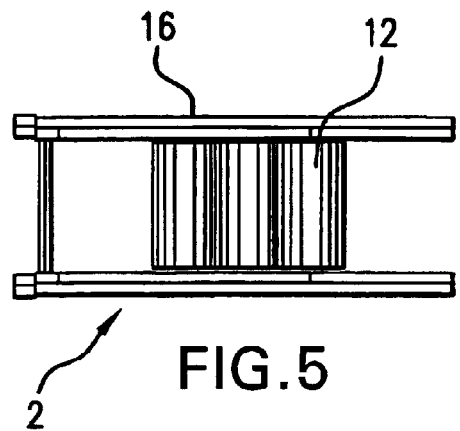
FIG. 5 is a top or plan view of a portion of the conveyor of FIG. 2, the view being taken along the lines A—A of FIG. 2.
Figure 6:
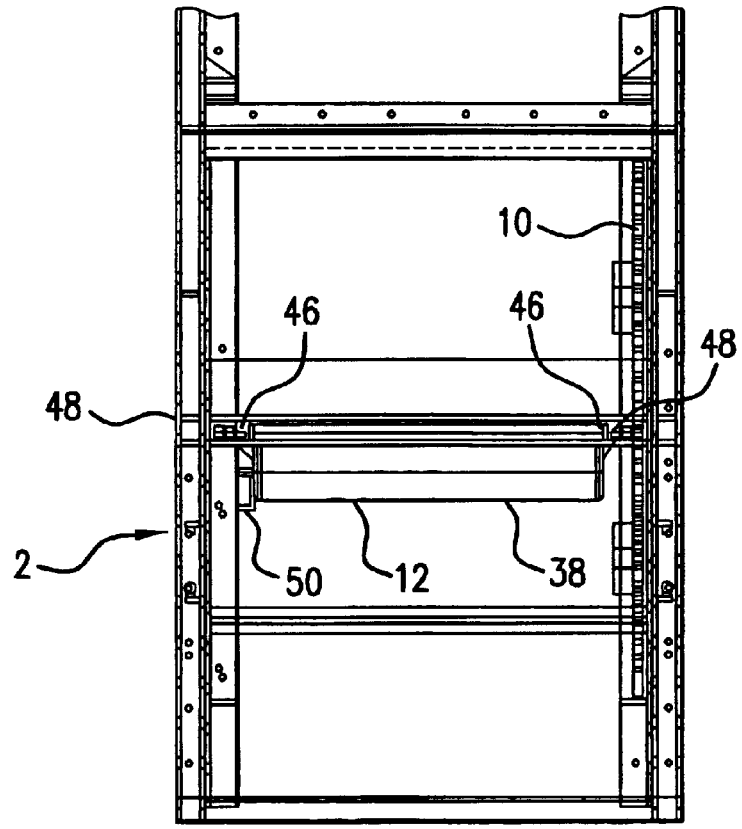
FIG. 6 is an enlarged view of a portion of the end view of FIG. 4 to illustrate a bucket traveling in the conveyor.
Figure 10:
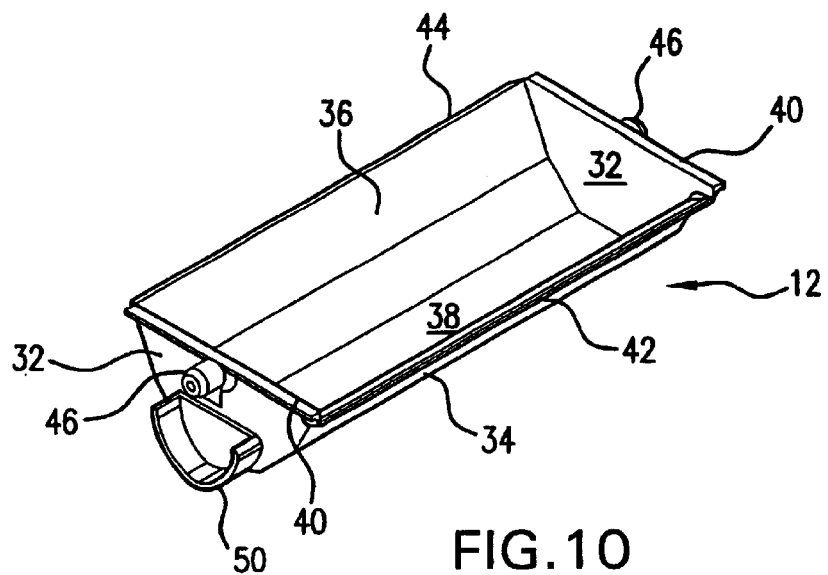
FIG. 10 is a perspective view of a bucket used in the conveyor of the invention.
Figure 11:
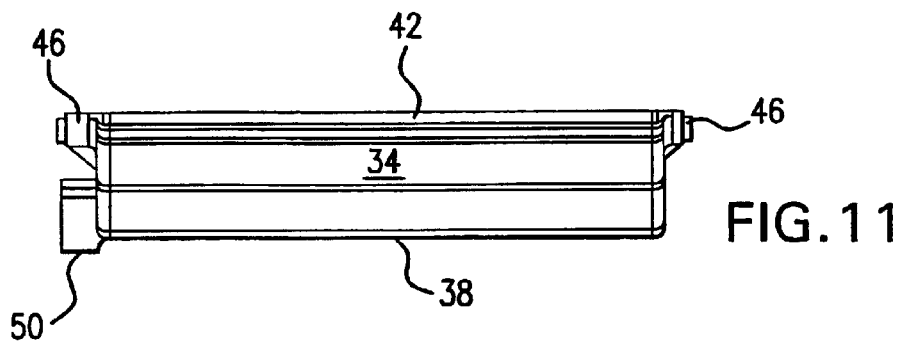
FIG. 11 is a front elevational view of the bucket of FIG. 10.
Figure 12:
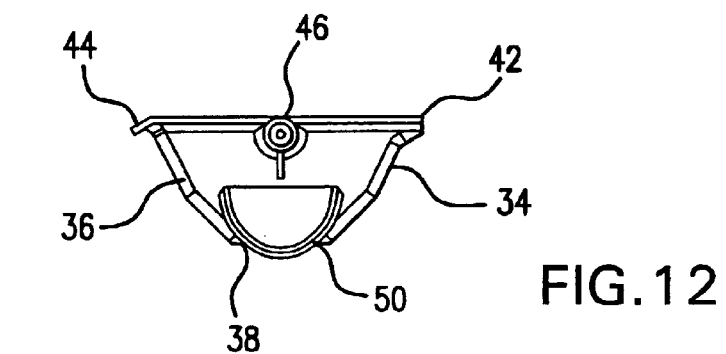
FIG. 12 is an end elevational view of the bucket of FIG. 10.
Figure 13:
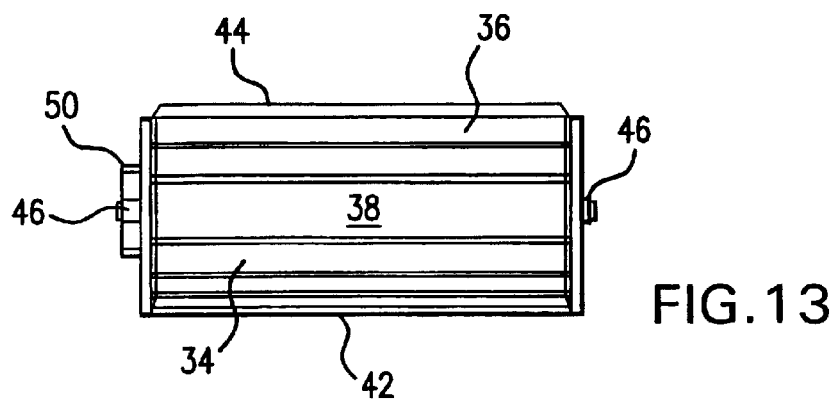
FIG. 13 is a top or plan view of the bucket of FIG. 10.

In FIG. 2, a substantially identical conveyor of a "Z" configuration is shown with the paths of the chains 10 and buckets 12 being the same as that described with respect to FIG. 1, the only exception being that FIG. 2 does not contain an intermediate discharge station. In this embodiment, the contents of all the buckets 12 will be discharged at the discharge station 24 at the outer end of the upper section 4. FIG. 5 is a view of the loading station 16 of FIG. 2 and illustrates that when traveling in a horizontal path beneath the loading station, the buckets 12 overlap so that product discharged into the buckets 12 at the loading station 16 cannot fall between the buckets 12, thus minimizing spillage.

The individual buckets 12 are shown in detail in FIGS. 10–13. Each bucket 12 has spaced apart side walls 32 which are joined by a front wall 34, rear wall 36 and bottom wall 38. In the bucket illustrated in the drawings, the front wall 34 and rear wall 36 are shown in two sections to form a generally U-shaped bucket. It will be understood however that the walls of the buckets can be formed in a continuous curve or in a variety of other configurations as is well known to those skilled in the art. The side walls 32 have outwardly extending flanges 40 along their upper edges. Similarly, the front wall 34 contains a flange 42 and the rear wall 36 contains a flange 44, both along their upper edges. Rear flanges 44 extend downwardly at an acute angle from the plane extending along the top of the bucket 12. Each bucket 12 has extending outwardly from each side wall 32 just beneath the flange 40 a hub 46 which is centered so that if the bucket 12 is suspended from the hub 46, it will be substantially level. The hubs 46 receive pins 48 (FIG. 6) that connect the buckets 12 to the chains 10. Each bucket 12 also contains on one side a cam 50 that provides a curved cam surface best seen in FIGS. 10 and 12. The function of the cam 50 will be described more fully hereinafter.

Figure 14:
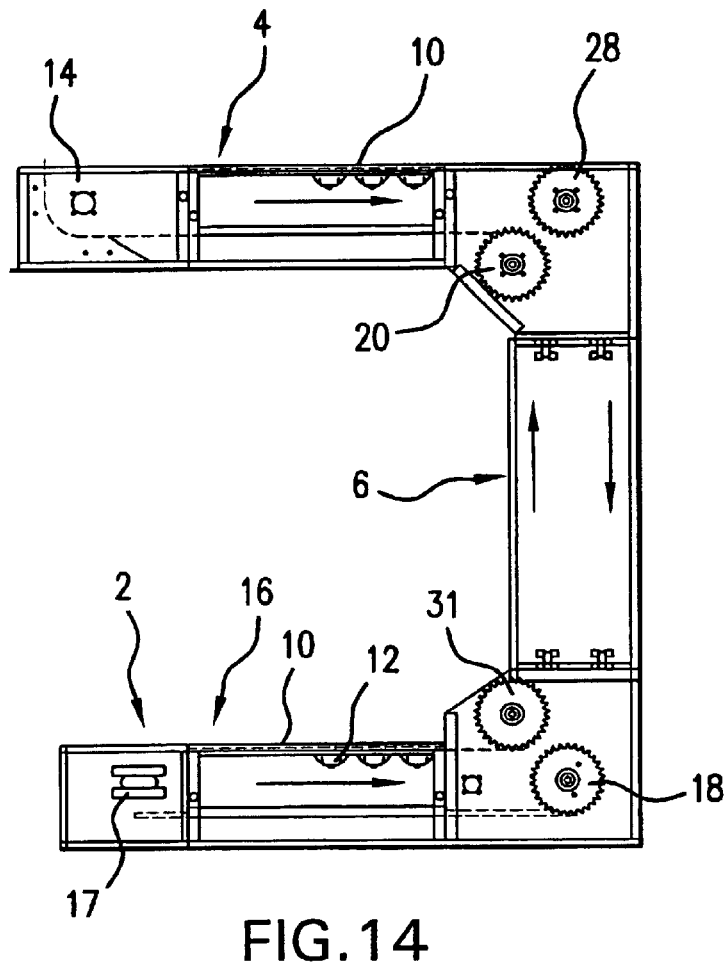
FIG. 14 is a side elevational view of a "C" configuration of a bucket elevator conveyor of the invention.
Figure 15:
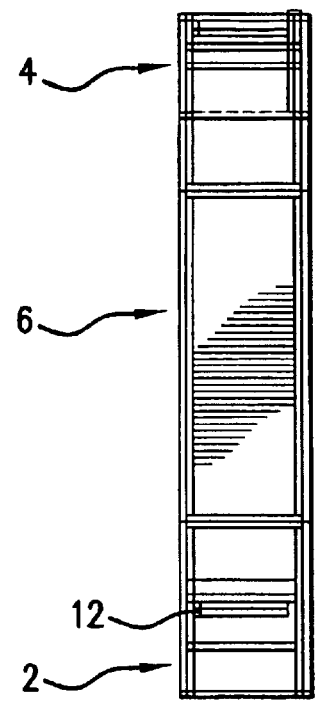
FIG. 15 is a side elevational view of the conveyor of FIG. 14 viewing the conveyor from the right side of FIG. 14.
Figure 16:
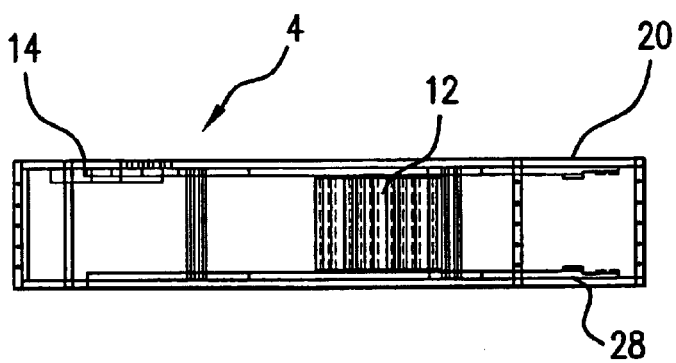
FIG. 16 is a top or plan view of the conveyor of FIG. 14.
Figure 17:
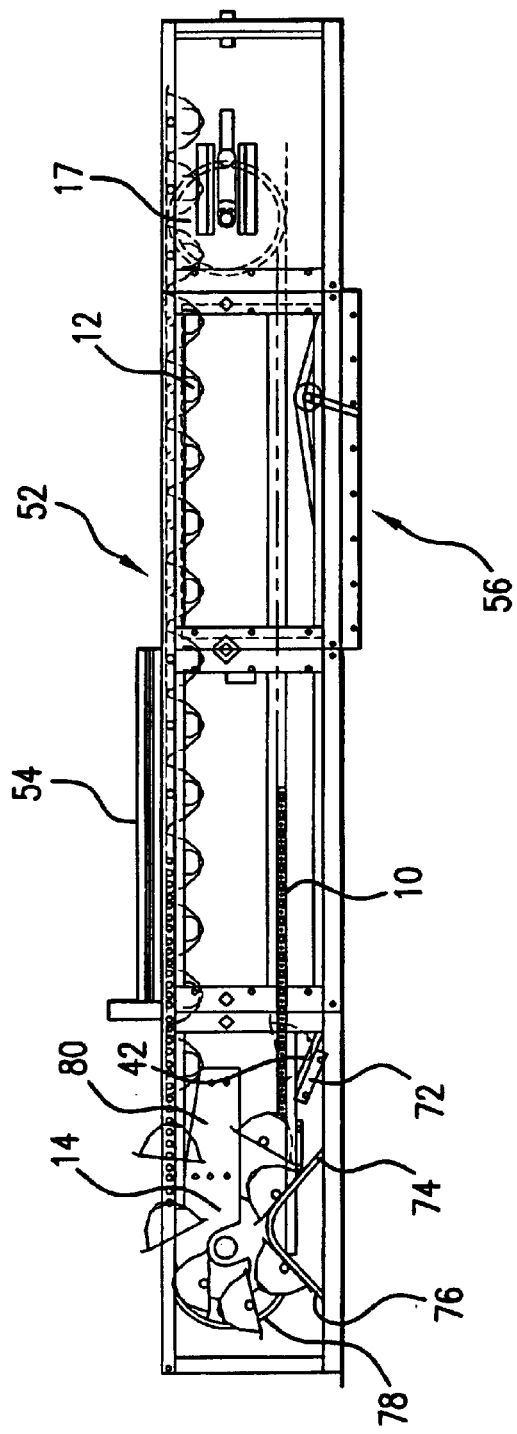
FIG. 17 is a side elevational view of a horizontal conveyor constructed according to the invention and illustrating a second embodiment for relapping the buckets.

FIGS. 14–16 illustrate a bucket elevator conveyor which has the same components and functions in the same manner as the conveyors of FIGS. 1 and 2 except that the configuration is that of a "C". Similarly, FIG. 17 illustrates a straight, horizontal conveyor that incorporates the principles of the invention. This conveyor operates in the same manner as the "Z" and "C" configurations except obviously it has a single horizontal section which is designated 52 in FIG. 17. The chains 10 carrying the buckets 12 move in the directions of the arrows shown in FIG. 17, and the buckets 12 are loaded at the loading station 54 and discharged at the discharge station 56.

Because of the manner in which the buckets 12 are driven and the paths that they follow from the loading stations, all the conveyors of the invention provide for much simpler and less costly intermediate discharge. By "intermediate" is meant that the contents of the buckets 12 are discharged somewhere between the sprockets at the ends of one of the horizontal sections. The location of the intermediate discharge stations will depend upon the requirements of the user. FIG. 1 shows the intermediate discharge station 8 in the lower path of the upper section 4. FIG. 17 which shows a simple horizontal conveyor shows the discharge station located at 56. FIG. 19 illustrates an extended horizontal conveyor which could also be the upper section of a "Z" or "C" configuration, and FIG. 19 shows two intermediate discharge stations 58 and a discharge station 59 at the drive end. These variations illustrate the flexibility of the conveyors of the invention that can be adapted to serve the varying needs of the user. As stated, the design of the conveyors of the invention greatly simplify discharge of the product at these intermediate stations. Discharge is accomplished by placing a discharge ramp 60 (see FIG. 7) that is pivoted between its ends to provide an inclined ramp 62 that will engage the cam 50 on each moving bucket 12 causing the bucket 12 to rotate about pins 48 and discharge the contents into a hopper or other suitable means such as the hopper 10 shown in FIG. 1. The discharge ramp 60 is moved upwardly to form the inclined ramp 62 by any suitable means such as a rack-pinion arrangement 64 in which one end of the rack is pivotally connected to the ramp 62 so that it is moved upwardly and downwardly as the rack moves. The rack can be moved manually or can be moved and controlled automatically. Once a bucket 12 passes up over the inclined ramp 62 and down the other side 63, the bucket 12 will return to its upright position.

However, after buckets 12 are tipped to discharge their contents or they are filled and passed around the take-up sprocket 17, they must be "relapped" to assure proper lapping of the front flange 42 with the rear flange 44 of the adjacent bucket. Proper lapping occurs when the rear flange 44 of a bucket 12 laps over the top of the front flange 42 of the adjacent bucket 12. Proper lapping is shown in FIG. 8 in which Bucket A and Bucket B are properly lapped. The invention provides three different ways of relapping, any one of which can be used on a conveyor of any configuration, although the relapping mechanism shown in FIGS. 8 and 9 would not be necessary on a straight horizontal conveyor. The three overlapping methods will now be described.

FIGS. 8 and 9 illustrate one method of relapping the buckets after they have been filled with product. FIG. 8 illustrates the relapping mechanism as installed on the "Z" configuration conveyors of FIGS. 1 and 2. FIG. 8 illustrates the components at the transition section 7 between the lower horizontal section 2 and vertical section 6. In this type of conveyor, relapping occurs after the buckets 12 have been filled at the loading station 16 and before they pass around the guide sprockets 18 and 20. This is done at this time because if the buckets 12 filled with product are not properly lapped, they can jam when passing around the guide sprockets 18 and 20 causing the entire conveying system to shut down with resultant loss of product through spillage and loss of production time. Thus, with the "Z" and "C" configurations, it is important to assure proper lapping of the buckets 12, and it is important to assure proper lapping of the buckets 12 before they are elevated through the vertical section 6. As shown in FIG. 8 and FIG. 9, guide sprocket 18 is provided with paddles 66 spaced apart along radial lines of the sprocket 18 with the each paddle 66 being attached in any suitable manner so that it extends outwardly beyond the pitch line of the sprocket 18. In this way, the paddle 66 will engage the flanges 40 along the side walls 32 of each bucket 12. A relapping sprocket 68 is positioned just ahead of the guide sprocket 18. The relapping sprocket 68 contains paddles 70 similar to the paddles 66 of the guide sprocket 18. As illustrated in FIG. 8, as one of the buckets 12 (indicated as Bucket C in FIG. 8) passes by the relapping sprocket 68, the paddle 70 will engage the trailing edge of the flange 40 to cause the front flange 42 of Bucket C to tip upwardly. The spacing of the relapping sprocket 68 from the guide sprocket 18 is such that the Bucket B just ahead of Bucket C will have the leading edge of the flange 40 simultaneously engaged by a paddle 66 to tip its front flange 42 downwardly. This will assure that front flange 42 of Bucket B will be beneath the rear flange 44 of Bucket A. It is necessary to tip Bucket C as shown in FIG. 8 to permit the rear flange 44 of Bucket B to clear the front flange 42 of Bucket C. Without tipping Bucket C counterclockwise as shown in FIG. 8, tipping of Bucket B clockwise could cause spillage from the trailing bucket, Bucket C. Although Buckets A, B and C will rock somewhat, the contents will not be spilled. At the speeds at which these conveyors are normally driven, the synchronized actions created by relapping sprocket 68 and guide sprocket 18 are necessary to eliminate abrupt engagement of the buckets 12 and thereby assure proper lapping without spilling the contents of the buckets 12. Although relapping can be accomplished using only the guide sprocket 18, addition of the sprocket 68 greatly minimizes noise.

Referring now to FIG. 17, there is illustrated a second relapping technique that may be used on any of the conveyor configurations. In this embodiment of the relapping mechanism, relapping occurs after the contents of the buckets have been discharged at the intermediate discharge station 56, which is the only discharge station for this particular conveyor 52. The empty buckets 12 traveling from right to left in FIG. 17 are first tipped forwardly or counterclockwise by engagement of the cam 50 on each bucket 12 by an inclined ramp 72 containing an inclined surface. The inclined ramp 72 is positioned in the path of the cams 50 to create this motion. As each bucket 12 is tipped forwardly, its front flange 42 engages a second ramp 74 that resembles somewhat an inverted "U". Ramp 74 is positioned inwardly from ramp 72 so that it will engage the front flange 42 of the bucket 12. As illustrated in FIG. 17, as the bucket 12 continues along its path, it will be tipped upside down and will continue to rotate counterclockwise to an accelerated speed. When bucket 12 is on the down side 76 of the ramp 74, the cam 50 on each bucket 12 will engage a curved cam surface 78 resembling somewhat a "C". This will guide each bucket 12 and continue its clockwise rotation around the drive sprocket 14 so that when the cam 50 becomes disengaged from the cam surface 78, the bucket 12 will have passed through almost a complete turn. The cam 50 of each bucket 12 will then engage a declining ramp 80 which will gradually return the bucket to its properly lapped position with the rear flange 44 of each bucket lapping over the front edge 42 of the bucket immediately trailing it. The buckets 12 are then properly lapped for loading at the loading station 54.

Figure 18:
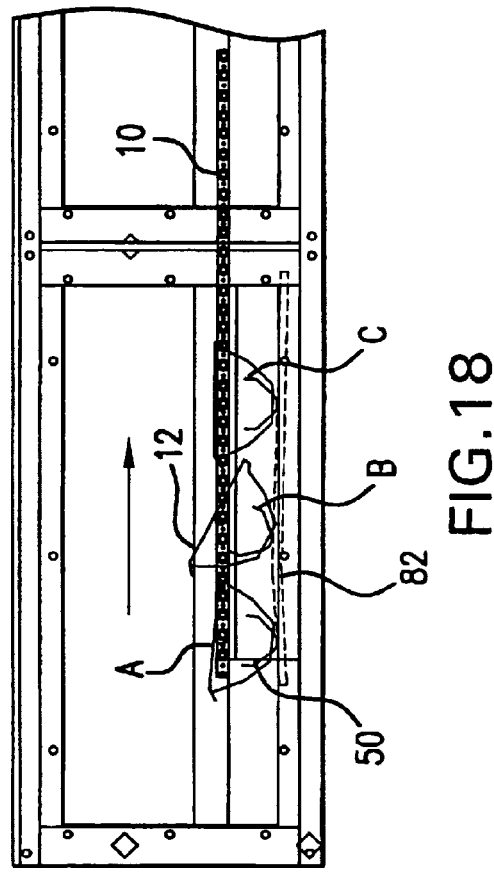
FIG. 18 is a side elevational view of a portion of a conveyor of any configuration and illustrating a third embodiment for relapping the buckets.

Yet another relapping technique is illustrated in FIG. 18. This very simple relapping technique can be used on a conveyor of any configuration. With the buckets traveling in the direction of the arrow of FIG. 18, there is provided an inclined ramp 82 positioned to engage the cam 50 on each bucket. Thus, as a bucket 12 moves along its path, the cam 50 will engage the surface of the ramp 82 tipping the bucket 12 slightly clockwise with the front edge 42 tilted downwardly. This is shown by Bucket A in FIG. 18. Bucket B just ahead of Bucket A has been tipped to a greater forward angle than Bucket A while Bucket C ahead of Bucket B is back to its normal position. As illustrated in FIG. 18, the inclined ramp 82 is dimensioned to produce the tipping illustrated in FIG. 18 so that each Bucket A will be tipped downwardly slightly while the bucket ahead of it, Bucket B, is tipped to a greater angle to assure that the front flange 42 of Bucket A will be beneath the rear flange 44 of Bucket B, and similarly, the front flange 42 of Bucket B will be beneath the rear flange 44 of Bucket C. The action and synchronization of the buckets 12 is the same as that of the relapping mechanism shown in FIG. 8. Obviously, the mechanism of FIG. 8 is a very simple mechanism for relapping the buckets 12.

Except for the embodiment of FIGS. 8 and 9, the effectiveness of all of the relapping mechanisms of the invention are dependent upon the design of the surface of cam 50 for each bucket and the cam surfaces of the various ramps that are positioned to engage the cam 50. The specific designs of these surfaces are within the abilities of those skilled in the art. Having thus described the invention in connection with the preferred embodiments thereof, it will be evident to those skilled in the art that various revisions can be made to the preferred embodiments described herein without departing from the spirit and scope of the invention.

What is claimed is as follows:

1. A bucket elevator conveyor system comprised of a single horizontal conveyor for transporting loose material from a loading station to a discharge station, the system comprising:

a pair of endless, parallel spaced apart chains;

a supporting framework that defines an endless path for moving the chains from the loading station through the discharge station and on a return path to the loading station;

drive sprockets rotatable about horizontal axes at one end of the conveyor for moving the chains along the defined paths that include upper paths at the top of the sprockets and lower paths at the bottom of the sprockets;

take-up sprockets for returning the chains to the drive sprockets, the take-up sprockets being rotatable about horizontal axes at the other end of the conveyor for moving the chains along the defined paths that include upper paths at the top of the sprockets and lower paths at the bottom of the sprockets, the loading station being located near the take-up sprocket end and the discharge station being located near the drive sprocket end of the conveyor;

a plurality of spaced-apart buckets each pivotally mounted on the chains and moveable with the chains to receive material at the loading station and discharge material at the discharge station;

each bucket having spaced apart side walls joined by a front wall and a rear wall to form a generally U-shaped bucket with top edges;

a front flange extending outwardly from the top edge of the front wall and a rear flange extending outwardly from the top edge of the rear wall;

a hub extending outwardly from each side wall of each bucket from a point beneath the side wall top edge, the hubs being positioned so that the top edges of the bucket are substantially level when the bucket is suspended from the chains by the hubs;

pivot pins combined with the hubs on each bucket for pivotally connecting the bucket to the chains;

a cam extending outwardly from a side wall of each bucket at a point below the hub;

a discharge ramp positioned along a lower path to engage the cam on each bucket as it passes along the ramp to rotate the bucket and discharge the contents of the bucket; and a relapping mechanism located beyond the discharge station and along the lower path of the chains near the drive sprockets, the relapping mechanism including a first inclined ramp engageable by the cam on each bucket as it travels along the lower path to tip the bucket forwardly and a second ramp having an upside and a downside, the upside being engageable by the front flange of the tipped bucket to tip the bucket upside down and cause the bucket to travel upside down along the downside of the second ramp, a cam surface around the outside of the drive sprocket and engageable with the cam on the bucket to continue the rotation of the bucket to an upright position as the bucket passes around the drive sprockets, and a declining ramp positioned to engage the cam on each bucket as the bucket completes its path around the drive sprockets to tip the bucket so that the rear flange on the bucket is lapped over the front flange of the bucket immediately trailing it.

2. A bucket elevator conveyor system comprised of a "Z" configuration with a lower horizontal section, an upper horizontal section and a substantially vertical section connecting the horizontal sections for transporting loose material from a loading station to a discharge station, the system comprising:

a pair of endless, parallel spaced apart chains;

a supporting framework that defines an endless path for moving the chains from the loading station through the discharge station and on a return path to the loading station;

drive sprockets located in the upper horizontal section and rotatable about horizontal axes at one end of the conveyor for moving the chains along the defined paths that include upper paths at the top of the sprockets and lower paths at the bottom of the sprockets;

take-up sprockets located in the lower horizontal section for returning the chains to the drive sprockets, the take-up sprockets being rotatable about horizontal axes at the other end of the conveyor for moving the chains along the defined paths that include upper paths at the top of the sprockets and lower paths at the bottom of the sprockets, the loading station being located near the take-up sprocket end and the discharge station being located near the drive sprocket end of the conveyor;

guide sprockets positioned at the junction of the vertical section and the upper and lower horizontal sections;

a plurality of spaced-apart buckets each pivotally mounted on the chains and moveable with the chains to receive material at the loading station and discharge material at the discharge station;

each bucket having spaced apart side walls joined by a front wall and a rear wall to form a generally U-shaped bucket with top edges;

a front flange extending outwardly from the top edge of the front wall and a rear flange extending outwardly from the top edge of the rear wall;

a hub extending outwardly from each side wall of each bucket from a point beneath the side wall top edge, the hubs being positioned so that the top edges of the bucket are substantially level when the bucket is suspended from the chains by the hubs;

pivot pins combined with the hubs on each bucket for pivotally connecting the bucket to the chains;

a cam extending outwardly from a side wall of each bucket at a point below the hub;

a discharge ramp positioned along a lower path to engage the cam on each bucket as it passes along the ramp to rotate the bucket and discharge the contents of the bucket; and a relapping mechanism located beyond the discharge station and along the lower path of the upper horizontal section near the drive sprockets, the relapping mechanism including a first inclined ramp engageable by the cam on each bucket as it travels along the lower path to tip the bucket forwardly and a second ramp having an upside and a downside, the upside being engageable by the front flange of the tipped bucket to tip the bucket upside down and cause the bucket to travel upside down along the downside of the second ramp, a cam surface around the outside of the drive sprocket and engageable with the cam on the bucket to continue the rotation of the bucket to an upright position as the bucket passes around the drive sprockets, and a declining ramp positioned to engage the cam on each bucket as the bucket completes its path around the drive sprockets to tip the bucket so that the rear flange on the bucket is lapped over the front flange of the bucket immediately trailing it.

3. A bucket elevator conveyor system comprised of a "C" configuration with a lower horizontal section, an upper horizontal section and a substantially vertical section connecting the horizontal sections, for transporting loose material from a loading station to a discharge station, the system comprising:

a pair of endless, parallel spaced apart chains;

a supporting framework that defines an endless path for moving the chains from the loading station through the discharge station and on a return path to the loading station;

drive sprockets located in the upper horizontal section and rotatable about horizontal axes at one end of the conveyor for moving the chains along the defined paths that include upper paths at the top of the sprockets and lower paths at the bottom of the sprockets;

take-up sprockets located in the lower horizontal section for returning the chains to the drive sprockets, the take-up sprockets being rotatable about horizontal axes at the other end of the conveyor for moving the chains along the defined paths that include upper paths at the top of the sprockets and lower paths at the bottom of the sprockets, the loading station being located near the take-up sprocket end and the discharge station being located near the drive sprocket end of the conveyor;

guide sprockets positioned at the junction of the vertical section and the upper and lower horizontal sections;

a plurality of spaced-apart buckets each pivotally mounted on the chains and moveable with the chains to receive material at the loading station and discharge material at the discharge station;

each bucket having spaced apart side walls joined by a front wall and a rear wall to form a generally U-shaped bucket with top edges;

a front flange extending outwardly from the top edge of the front wall and a rear flange extending outwardly from the top edge of the rear wall;

a hub extending outwardly from each side wall of each bucket from a point beneath the side wall top edge, the hubs being positioned so that the top edges of the bucket are substantially level when the bucket is suspended from the chains by the hubs;

pivot pins combined with the hubs on each bucket for pivotally connecting the bucket to the chains;

a cam extending outwardly from a side wall of each bucket at a point below the hub;

a discharge ramp positioned along a lower path to engage the cam on each bucket as it passes along the ramp to rotate the bucket and discharge the contents of the bucket; and a relapping mechanism located beyond the discharge station and along the lower path of the upper horizontal section near the drive sprockets, the relapping mechanism including a first inclined ramp engageable by the cam on each bucket as it travels along the lower path to tip the bucket forwardly and a second ramp having an upside and a downside, the upside being engageable by the front flange of the tipped bucket to tip the bucket upside down and cause the bucket to travel upside down along the downside of the second ramp, a cam surface around the outside of the drive sprocket and engageable with the cam on the bucket to continue the rotation of the bucket to an upright position as the bucket passes around the drive sprockets, and a declining ramp positioned to engage the cam on each bucket as the bucket completes its path around the drive sprockets to tip the bucket so that the rear flange on the bucket is lapped over the front flange of the bucket immediately trailing it.

4. A bucket elevator conveyor system comprised of a "Z" configuration with a lower horizontal section, an upper horizontal section and a substantially vertical section connecting the horizontal sections for transporting loose material from a loading station to a discharge station, the system comprising:

a pair of endless, parallel spaced apart chains;

a supporting framework that defines an endless path for moving the chains from the loading station through the discharge station and on a return path to the loading station;

drive sprockets located in the upper horizontal section and rotatable about horizontal axes at one end of the conveyor for moving the chains along the defined paths that include upper paths at the top of the sprockets and lower paths at the bottom of the sprockets;

take-up sprockets located in the lower horizontal section for returning the chains to the drive sprockets, the take-up sprockets being rotatable about horizontal axes at the other end of the conveyor for moving the chains along the defined paths that include upper paths at the top of the sprockets and lower paths at the bottom of the sprockets, the loading station being located near the take-up sprocket end and the discharge station being located near the drive sprocket end of the conveyor;

guide sprockets positioned at the junction of the vertical section and the upper and lower horizontal sections;

a plurality of spaced-apart buckets each pivotally mounted on the chains and moveable with the chains to receive material at the loading station and discharge material at the discharge station;

each bucket having spaced apart side walls joined by a front wall and a rear wall to form a generally U-shaped bucket with top edges;

a front flange extending outwardly from the top edge of the front wall and a rear flange extending outwardly from the top edge of the rear wall;

a hub extending outwardly from each side wall of each bucket from a point beneath the side wall top edge, the hubs being positioned so that the top edges of the bucket are substantially level when the bucket is suspended from the chains by the hubs;

pivot pins combined with the hubs on each bucket for pivotally connecting the bucket to the chains;

a cam extending outwardly from a side wall of each bucket at a point below the hub;

a discharge ramp positioned along a lower path to engage the cam on each bucket as it passes along the ramp to rotate the bucket and discharge the contents of the bucket; and a relapping mechanism located at the juncture of the lower horizontal section and the vertical section near the guide sprockets, the relapping mechanism comprising a plurality of spaced-apart paddles mounted on one of the guide sprockets interiorly of the sprocket so as to be in the path of the buckets, the paddles extending radially outwardly beyond a pitch line of the guide sprocket so as to engage the top edge of a side wall of the bucket, and a relapping sprocket engageable with the chain upstream from the guide sprockets, the relapping sprocket having a plurality of spaced-apart paddles mounted on the relapping sprocket interiorly of the sprocket so as to be in the path of the buckets, the paddles on the relapping sprocket extending radially outwardly beyond a pitch line of the relapping sprocket so as to engage the top edge of a side wall of the bucket, the diameter of the relapping sprocket and the location of the relapping sprocket relative to the guide sprocket being such that a first bucket downstream from a second bucket will have the leading portion of the top edge of a side wall engaged by a paddle on the guide sprocket simultaneously with engagement of the trailing portion of the top edge of the side wall by a paddle on the relapping sprocket thereby assuring that the front flange of the first bucket will be beneath the rear flange of the bucket immediately downstream from the first bucket and therefore properly lapped.

5. A bucket elevator conveyor system comprised of a "C" configuration with a lower horizontal section, an upper horizontal section and a substantially vertical section connecting the horizontal sections, for transporting loose material from a loading station to a discharge station, the system comprising:

a pair of endless, parallel spaced apart chains;

a supporting framework that defines an endless path for moving the chains from the loading station through the discharge station and on a return path to the loading station;

drive sprockets located in the upper horizontal section and rotatable about horizontal axes at one end of the conveyor for moving the chains along the defined paths that include upper paths at the top of the sprockets and lower paths at the bottom of the sprockets;

take-up sprockets located in the lower horizontal section for returning the chains to the drive sprockets, the take-up sprockets being rotatable about horizontal axes at the other end of the conveyor for moving the chains along the defined paths that include upper paths at the top of the sprockets and lower paths at the bottom of the sprockets, the loading station being located near the take-up sprocket end and the discharge station being located near the drive sprocket end of the conveyor;

guide sprockets positioned at the junction of the vertical section and the upper and lower horizontal sections;

a plurality of spaced-apart buckets each pivotally mounted on the chains and moveable with the chains to receive material at the loading station and discharge material at the discharge station;

each bucket having spaced apart side walls joined by a front wall and a rear wall to form a generally U-shaped bucket with top edges;

a front flange extending outwardly from the top edge of the front wall and a rear flange extending outwardly from the top edge of the rear wall;

a hub extending outwardly from each side wall of each bucket from a point beneath the side wall top edge, the hubs being positioned so that the top edges of the bucket are substantially level when the bucket is suspended from the chains by the hubs;

pivot pins combined with the hubs on each bucket for pivotally connecting the bucket to the chains;

a cam extending outwardly from a side wall of each bucket at a point below the hub;

a discharge ramp positioned along a lower path to engage the cam on each bucket as it passes along the ramp to rotate the bucket and discharge the contents of the bucket; and a relapping mechanism located at the juncture of the lower horizontal section and the vertical section near the guide sprockets, the relapping mechanism comprising a plurality of spaced-apart paddles mounted on one of the guide sprockets interiorly of the sprocket so as to be in the path of the buckets, the paddles extending radially outwardly beyond a pitch line of the guide sprocket so as to engage the top edge of a side wall of the bucket, and a relapping sprocket engageable with the chain upstream from the guide sprockets, the relapping sprocket having a plurality of spaced-apart paddles mounted on the relapping sprocket interiorly of the sprocket so as to be in the path of the buckets, the paddles on the relapping sprocket extending radially outwardly beyond a pitch line of the relapping sprocket so as to engage the top edge of a side wall of the bucket, the diameter of the relapping sprocket and the location of the relapping sprocket relative to the guide sprocket being such that a first bucket downstream from a second bucket will have the leading portion of the top edge of a side wall engaged by a paddle on the guide sprocket simultaneously with engagement of the trailing portion of the top edge of the side wall by a paddle on the relapping sprocket thereby assuring that the front flange of the first bucket will be beneath the rear flange of the bucket immediately downstream from the first bucket and therefore properly lapped.

6. A bucket elevator conveyor system comprised of a single horizontal conveyor for transporting loose material from a loading station to a discharge station, the system comprising:

a pair of endless, parallel spaced apart chains;

a supporting framework that defines an endless path for moving the chains from the loading station through the discharge station and on a return path to the loading station;

drive sprockets rotatable about horizontal axes at one end of the conveyor for moving the chains along the defined paths that include upper paths at the top of the sprockets and lower paths at the bottom of the sprockets;

take-up sprockets for returning the chains to the drive sprockets, the take-up sprockets being rotatable about horizontal axes at the other end of the conveyor for moving the chains along the defined paths that include upper paths at the top of the sprockets and lower paths at the bottom of the sprockets, the loading station being located near the take-up sprocket end and the discharge station being located near the drive sprocket end of the conveyor;

a plurality of spaced-apart buckets each pivotally mounted on the chains and moveable with the chains to receive material at the loading station and discharge material at the discharge station;

each bucket having spaced apart side walls joined by a front wall and a rear wall to form a generally U-shaped bucket with top edges;

a front flange extending outwardly from the top edge of the front wall and a rear flange extending outwardly from the top edge of the rear wall;

a hub extending outwardly from each side wall of each bucket from a point beneath the side wall top edge, the hubs being positioned so that the top edges of the bucket are substantially level when the bucket is suspended from the chains by the hubs;

pivot pins combined with the hubs on each bucket for pivotally connecting the bucket to the chains;

a cam extending outwardly from a side wall of each bucket at a point below the hub;

a discharge ramp positioned along a lower path to engage the cam on each bucket as it passes along the ramp to rotate the bucket and discharge the contents of the bucket; and a relapping mechanism located between the discharge station and the loading station, the relapping mechanism including an inclined ramp engageable by the cam on each bucket as it travels along its defined path to tip the front flange of each bucket downwardly, the incline of the ramp being such that a the front flange of a first bucket downstream from a second bucket will be tipped a greater amount than the front flange of a second bucket immediately following the first bucket thereby assuring that the front flange of the second bucket will be positioned beneath the rear flange of the first bucket.

7. A bucket elevator conveyor system comprised of a "Z" configuration with a lower horizontal section, an upper horizontal section and a substantially vertical section connecting the horizontal sections for transporting loose material from a loading station to a discharge station, the system comprising:

a pair of endless, parallel spaced apart chains;

a supporting framework that defines an endless path for moving the chains from the loading station through the discharge station and on a return path to the loading station;

drive sprockets located in the upper horizontal section and rotatable about horizontal axes at one end of the conveyor for moving the chains along the defined paths that include upper paths at the top of the sprockets and lower paths at the bottom of the sprockets;

take-up sprockets located in the lower horizontal section for returning the chains to the drive sprockets, the take-up sprockets being rotatable about horizontal axes at the other end of the conveyor for moving the chains along the defined paths that include upper paths at the top of the sprockets and lower paths at the bottom of the sprockets, the loading station being located near the take-up sprocket end and the discharge station being located near the drive sprocket end of the conveyor;

guide sprockets positioned at the junction of the vertical section and the upper and lower horizontal sections;

a plurality of spaced-apart buckets each pivotally mounted on the chains and moveable with the chains to receive material at the loading station and discharge material at the discharge station;

each bucket having spaced apart side walls joined by a front wall and a rear wall to form a generally U-shaped bucket with top edges;

a front flange extending outwardly from the top edge of the front wall and a rear flange extending outwardly from the top edge of the rear wall;

a hub extending outwardly from each side wall of each bucket from a point beneath the side wall top edge, the hubs being positioned so that the top edges of the bucket are substantially level when the bucket is suspended from the chains by the hubs;

pivot pins combined with the hubs on each bucket for pivotally connecting the bucket to the chains;

a cam extending outwardly from a side wall of each bucket at a point below the hub;

a discharge ramp positioned along a lower path to engage the cam on each bucket as it passes along the ramp to rotate the bucket and discharge the contents of the bucket; and a relapping mechanism located between the discharge station and the loading station, the relapping mechanism including an inclined ramp engageable by the cam on each bucket as it travels along its defined path to tip the front flange of each bucket downwardly, the incline of the ramp being such that the front flange of a first bucket downstream from a second bucket will be tipped a greater amount than the front flange of a second bucket immediately following the first bucket thereby assuring that the front flange of the second bucket will be positioned beneath the rear flange of the first bucket.

8. A bucket elevator conveyor system comprised of a "C" configuration with a lower horizontal section, an upper horizontal section and a substantially vertical section connecting the horizontal sections, for transporting loose material from a loading station to a discharge station, the system comprising:

a pair of endless, parallel spaced apart chains;

a supporting framework that defines an endless path for moving the chains from the loading station through the discharge station and on a return path to the loading station;

drive sprockets located in the upper horizontal section and rotatable about horizontal axes at one end of the conveyor for moving the chains along the defined paths that include upper paths at the top of the sprockets and lower paths at the bottom of the sprockets;

take-up sprockets located in the lower horizontal section for returning the chains to the drive sprockets, the take-up sprockets being rotatable about horizontal axes at the other end of the conveyor for moving the chains along the defined paths that include upper paths at the top of the sprockets and lower paths at the bottom of the sprockets, the loading station being located near the take-up sprocket end and the discharge station being located near the drive sprocket end of the conveyor;

guide sprockets positioned at the junction of the vertical section and the upper and lower horizontal sections;

a plurality of spaced-apart buckets each pivotally mounted on the chains and moveable with the chains to receive material at the loading station and discharge material at the discharge station;

each bucket having spaced apart side walls joined by a front wall and a rear wall to form a generally U-shaped bucket with top edges;

a front flange extending outwardly from the top edge of the front wall and a rear flange extending outwardly from the top edge of the rear wall;

a hub extending outwardly from each side wall of each bucket from a point beneath the side wall top edge, the hubs being positioned so that the top edges of the bucket are substantially level when the bucket is suspended from the chains by the hubs;

pivot pins combined with the hubs on each bucket for pivotally connecting the bucket to the chains;

a cam extending outwardly from a side wall of each bucket at a point below the hub;

a discharge ramp positioned along a lower path to engage the cam on each bucket as it passes along the ramp to rotate the bucket and discharge the contents of the bucket; and a relapping mechanism located between the discharge station and the loading station, the relapping mechanism including an inclined ramp engageable by the cam on each bucket as it travels along its defined path to tip the front flange of each bucket downwardly, the incline of the ramp being such that the front flange of a first bucket downstream from a second bucket will be tipped a greater amount than the front flange of a second bucket immediately following the first bucket thereby assuring that the front flange of the second bucket will be positioned beneath the rear flange of the first bucket.

9. A bucket elevator conveyor system for transporting loose material from a loading station to a discharge station, the system comprising:

a pair of endless, parallel spaced apart chains;

a supporting framework that defines an endless path for moving the chains from the loading station through the discharge station and on a return path to the loading station;

drive sprockets rotatable about horizontal axes at one end of the conveyor for moving the chains along the defined paths that include upper paths at the top of the sprockets and lower paths at the bottom of the sprockets;

take-up sprockets for returning the chains to the drive sprockets, the take-up sprockets being rotatable about horizontal axes at the other end of the conveyor for moving the chains along the defined paths that include upper paths at the top of the sprockets and lower paths at the bottom of the sprockets, the loading station being located near the take-up sprocket end and the discharge station being located near the drive sprocket end of the conveyor;

a plurality of spaced-apart buckets each pivotally mounted on the chains and moveable with the chains to receive material at the loading station and discharge material at the discharge station;

each bucket having spaced apart side walls joined by a front wall and a rear wall to form a generally U-shaped bucket with top edges;

a front flange extending outwardly from the top edge of the front wall and a rear flange extending outwardly from the top edge of the rear wall;

a hub extending outwardly from each side wall of each bucket from a point beneath the side wall top edge, the hubs being positioned so that the top edges of the bucket are substantially level when the bucket is suspended from the chains by the hubs;

pivot pins combined with the hubs on each bucket for pivotally connecting the bucket to the chains;

a cam extending outwardly from a side wall of each bucket at a point below the hub;

a discharge ramp positioned along a lower path to engage the cam on each bucket as it passes along the ramp to rotate the bucket and discharge the contents of the bucket; and an intermediate discharge ramp located between the loading station and the discharge station, the intermediate discharge ramp being positioned along the lower path to engage the cam on each bucket as it passes along the intermediate ramp so as to rotate the bucket and discharge its contents before it reaches the discharge station; the intermediate discharge ramp being moveable into and out of the path of the buckets so as to be selectively used to discharge the contents of the buckets prior to the buckets reaching the discharge station.

* * * * *